United States Patent
Lesch et al.

(10) Patent No.: US 12,496,265 B2
(45) Date of Patent: Dec. 16, 2025

(54) FOAMING AQUEOUS COMPOSITION COMPRISING SPICULISPORIC ACID, AN ALKYL POLYGLYCOSIDE AND A POLYSACCHARIDE

(71) Applicant: L'OREAL, Paris (FR)

(72) Inventors: Sandie Lesch, Chevilly la Rue (FR); Catherine Marion, Chevilly la Rue (FR); Reda Agnaou, Chevilly la Rue (FR)

(73) Assignee: L'OREAL, Paris (FR)

( * ) Notice: Subject to any disclaimer, the term of this patent is extended or adjusted under 35 U.S.C. 154(b) by 791 days.

(21) Appl. No.: 16/955,342

(22) PCT Filed: Dec. 18, 2018

(86) PCT No.: PCT/EP2018/085531
§ 371 (c)(1),
(2) Date: Jun. 18, 2020

(87) PCT Pub. No.: WO2019/121706
PCT Pub. Date: Jun. 27, 2019

(65) Prior Publication Data
US 2021/0007959 A1 Jan. 14, 2021

(30) Foreign Application Priority Data

Dec. 19, 2017 (FR) ..................... 1762515

(51) Int. Cl.
| | | |
|---|---|---|
| *A61K 8/49* | (2006.01) | |
| *A61K 8/04* | (2006.01) | |
| *A61K 8/44* | (2006.01) | |
| *A61K 8/60* | (2006.01) | |
| *A61K 8/73* | (2006.01) | |
| *A61Q 1/14* | (2006.01) | |
| *A61Q 19/10* | (2006.01) | |

(52) U.S. Cl.
CPC ............ *A61K 8/4973* (2013.01); *A61K 8/046* (2013.01); *A61K 8/44* (2013.01); *A61K 8/604* (2013.01); *A61K 8/73* (2013.01); *A61K 8/733* (2013.01); *A61K 8/735* (2013.01); *A61K 8/737* (2013.01); *A61Q 1/14* (2013.01); *A61Q 19/10* (2013.01)

(58) Field of Classification Search
None
See application file for complete search history.

(56) References Cited

U.S. PATENT DOCUMENTS

2013/0115205 A1*  5/2013  Potechin .............. A61K 8/9722
                                                                  510/130
2016/0296448 A1* 10/2016  Terrisse .................... A61K 8/41

FOREIGN PATENT DOCUMENTS

| CN | 105705133 A | 6/2016 |
|---|---|---|
| FR | 3012959 A1 | 5/2015 |
| FR | 3046066 A1 | 6/2017 |
| JP | 2002-047137 A | 2/2002 |
| WO | WO 2017/109192 A2 | 6/2017 |

\* cited by examiner

*Primary Examiner* — Nicole P Babson
(74) *Attorney, Agent, or Firm* — POLSINELLI PC

(57) ABSTRACT

The present invention relates to an aqueous foaming composition comprising spiculisporic acid, at least one base, at least one nonionic surfactant chosen from alkyl polyglycosides, and at least one polysaccharide, and also to the use of said composition especially in the cosmetic field, as a product for cleansing and/or removing makeup from keratin materials such as the skin, keratin fibres (eyelashes and hair) or the scalp, and also for treating greasy skin and/or disinfecting the skin and/or the scalp. The composition in accordance with the invention makes it possible to obtain a clear foaming gel, which has a good level of viscosity and good cosmetic qualities, mainly good makeup-removing power and good foam properties (start, quality, quantity, stability and persistence), in particular when it is combined with a self-foaming device. The foam obtained has a good foam start, forms in large amount and is stable over time, which gives the composition a satisfactory application time (or play time).

22 Claims, No Drawings

FOAMING AQUEOUS COMPOSITION COMPRISING SPICULISPORIC ACID, AN ALKYL POLYGLYCOSIDE AND A POLYSACCHARIDE

CROSS REFERENCE TO RELATED APPLICATIONS

This application is a National Phase filing under 35 U.S.C. § 371 of PCT/EP2018/085531 filed on 18 Dec. 2018; which application in turn claims priority to Application No. 1762515 filed in France on 19 Dec. 2017. The entire contents of each application are hereby incorporated by reference.

The present invention relates to an aqueous foaming composition comprising spiculisporic acid, at least one base, at least one nonionic surfactant chosen from alkyl polyglycosides, and at least one polysaccharide, and also to the use of said composition especially in the cosmetic field, as a product for cleansing and/or removing makeup from keratin materials such as the skin, keratin fibres (eyelashes and hair) or the scalp, and also for treating greasy skin and/or disinfecting the skin and/or the scalp.

Cleansing of the skin is very important for facial care. It must be as effective as possible since fatty residues, such as excess sebum, the residues of cosmetic products used daily and makeup products accumulate in the skin folds and can block the skin pores and lead to the appearance of spots.

One way of satisfactorily cleansing the skin is to use foaming cleansing products. The foaming cleansing products currently commercially available are in the form of foaming bars, gels or creams. They generally contain either soaps, which have the advantage of giving a creamy foam but may cause tautness due to their excessive detergent power, or foaming surfactants such as sulfate surfactants, in particular sodium lauryl sulfate (SLS) or sodium laureth sulfates (SLES), or amphoteric surfactants, for instance cocoyl betaine, cocamidopropylbetaine or sodium cocoamphodiacetate, which are highly efficient in terms of foam and of detergent power, but which are called into question, wrongly or rightly, because of their ecotoxic or ecologically unfriendly environmental profile.

Since the formulation of environmentally friendly cosmetic products is becoming a major challenge for satisfying a new expectation of consumers, in particular for ecologically designed and/or natural products, it is necessary to propose foaming compositions free of sulfate surfactant and of amphoteric surfactant, which have good cosmetic qualities, mainly in terms of viscosity and of foam, and also good cleansing and/or makeup-removing power. It has been proposed to use spiculisporic acid, a microorganism-derived biosurfactant that is non-toxic to the environment, in cosmetic compositions. However, the makeup-removing power and foaming properties of this surfactant, when it is used alone, are not entirely satisfactory.

It has also been proposed to use spiculisporic acid and/or a salt thereof in combination with other foaming surfactants, especially in patent applications WO 2015/067779 and WO 2015/067785.

However, the makeup-removing power and foaming properties of the compositions based on spiculisporic acid described in the prior art remain insufficient.

Moreover, foaming products may be thickened by means of a salt, for example sodium chloride, for certain surfactants, or by adding a thickener of alkyl-PEG type such as PEG-150 distearate or PEG-55 propylene glycol oleate, or by adding a gelling agent of natural gum type, in particular xanthan gum, scleroglucan gum or carrageenan gum.

Thickening with salt is a known approach that is widely used for surfactant systems containing sulfates and amphoteric substances, since it makes it possible both to be cheap and also not to impair the foam qualities; however, in general, it cannot significantly thicken sulfate-free and/or amphoteric substance-free systems. On the other hand, increasing the viscosity of the medium with another thickener or gelling agent is a more versatile approach, but often has a negative impact on the foam qualities of the formula (the start of foaming, the amount of foam, the foam stability and persistence, etc.).

Thus, it would be good to have available foaming compositions free of surfactants of sulfate or amphoteric type, which have a good viscosity, good makeup-removing power and good foam qualities.

It has been discovered, surprisingly, that the combination of spiculisporic acid, of at least one base, of at least one nonionic surfactant chosen from alkyl polyglycosides, and of at least one polysaccharide makes it possible to obtain cleansing and/or makeup-removing compositions that have good makeup-removing power and great foam quality.

One subject of the present invention is thus a composition, especially a cosmetic composition and more particularly a foaming aqueous composition for cleansing and/or removing makeup from keratin materials, comprising spiculisporic acid, at least one base, at least one nonionic surfactant chosen from alkyl polyglycosides, and at least one polysaccharide, in which the ratio R1 of the number of moles of base to the number of moles of spiculisporic acid is strictly greater than 1.

The composition in accordance with the invention makes it possible to obtain a clear foaming gel, which has a good level of viscosity and good cosmetic qualities, mainly good makeup-removing power and good foam properties (start, quality, quantity, stability and persistence, etc.), in particular when it is combined with a self-foaming device.

The foam obtained has a good foam start, forms in large amount and is stable over time, which gives the composition a very satisfactory application time (or play time).

In the context of the present invention, the term "play time" or "application time" means the time for which the foam remains sufficiently abundant and consistent to be applied to keratin materials without running. A play time is said to be satisfactory when the application time is between 30 and 75 seconds, preferably between 50 and 70 seconds and better still between 55 and 70 seconds.

Moreover, the composition in accordance with the invention is stable over time.

The composition according to the invention is intended for topical application and thus contains a physiologically acceptable medium. The term "physiologically acceptable medium" means here a medium that is compatible with keratin materials.

In the context of the present invention, the term "keratin material" especially means the skin, the scalp, keratin fibres such as the eyelashes, the eyebrows, head hair, bodily hair, the nails, and mucous membranes such as the lips, and more particularly the skin (body, face, area around the eyes, eyelids).

In the following text, the expression "at least one" is equivalent to "one or more" and, unless otherwise indicated, the limits of a range of values are included in that range.

Spiculisporic Acid

Spiculisporic acid, also known under the name 4,5-dicarboxy-4-pentadecanolide, has the formula (I) below:

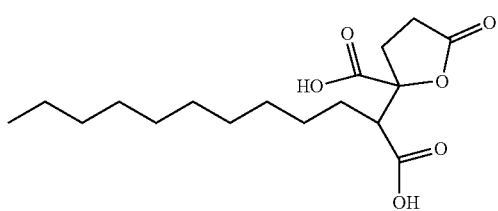 [SMILES: CCCCCCCCCCC(C(=O)O)C1(C(=O)O)CCC(=O)O1]

It is especially used as a surfactant.

Spiculisporic acid has the possibility of forming three salts; the sodium salts have been characterized:
- S-1Na, the monosodium salt, corresponding to the product of neutralization of the carboxylic group bonded to the carbon atom in position C4 of S-acid;
- S-2Na, the disodium salt, corresponding to the product of neutralization of the carboxylic groups bonded to the carbon atoms in positions C4 and C5 of S-acid;
- S-3Na, the trisodium salt, corresponding to the saponification of the lactone function of S-2Na.

In the context of the invention, spiculisporic acid is in the form of a salt.

Base

Thus, the cosmetic compositions according to the invention also comprise at least one base. In the context of the invention, and unless otherwise mentioned, the base used is a neutralizing base, i.e. it enables the spiculisporic acid to be neutralized so as to form a salt of said acid. Examples that may be mentioned include the sodium, potassium, triethanolamine and arginine salts of spiculisporic acid.

The organic or mineral base may be a Brønsted-Lowry base or a Lewis base.

In particular, the base(s) may be chosen from:
a) alkanolamines such as mono-, di- and triethanolamines, isopropanolamine and 2-amino-2-methyl-1-propanol, and also derivatives thereof,
b) oxyethylenated and/or oxypropylenated ethylenediamines,
c) mineral or organic hydroxides,
d) alkali metal silicates such as sodium metasilicates,
e) amino acids, preferably basic amino acids such as arginine, lysine, ornithine, citrulline and histidine,
f) carbonates and bicarbonates, particularly of a primary, secondary or tertiary amine, of an alkali metal or alkaline-earth metal, or of ammonium, and
g) the compounds of formula (III) below:

(III)

in which W is a $C_1$-$C_6$ alkylene residue optionally substituted with a hydroxyl group or a $C_1$-$C_6$ alkyl group; Rx, Ry, Rz and Rt, which may be identical or different, represent a hydrogen atom or a $C_1$-$C_6$ alkyl, $C_1$-$C_6$ hydroxyalkyl or $C_1$-$C_6$ aminoalkyl group.

Examples of such compounds of formula (III) that may be mentioned include 1,3-diaminopropane, 1,3-diamino-2-propanol, spermine and spermidine.

The mineral or organic hydroxides are preferably chosen from hydroxides of an alkali metal, hydroxides of an alkaline-earth metal, for instance sodium hydroxide or potassium hydroxide, hydroxides of a transition metal, such as hydroxides of metals from Groups III, IV, V and VI of the Periodic Table of the Elements, hydroxides of lanthanides or actinides, quaternary ammonium hydroxides and guanidinium hydroxide.

The hydroxide may be formed in situ, for instance guanidine hydroxide, formed by reacting calcium hydroxide and guanidine carbonate.

According to a particular embodiment of the invention, the base may be chosen from the group of mineral bases such as sodium hydroxide, potassium hydroxide, lithium hydroxide, caesium hydroxide, calcium hydroxide, magnesium hydroxide, zinc hydroxide, or similar bases, a basic mineral salt and a basic organic salt containing lithium, sodium, potassium, calcium, magnesium or ammonium, a basic amino acid such as lysine, arginine, histidine, citrulline, ornithine or the like, a basic oligopeptide containing these amino acids as bases, basic amines such as monoethanolamine, diethanolamine, 2-(dimethylamino)ethanol, triethanolamine, triisopropanolamine, diisopropanolamine, monoisopropanolamine, ammonia, or similar bases, or other organic bases such as guanidine carbonate and other similar bases, and mixtures thereof.

According to one embodiment, in the context of the present invention, the base is chosen from the group constituted by arginine, triethanolamine, potassium hydroxide and sodium hydroxide, and mixtures thereof.

According to one embodiment, the base is potassium hydroxide.

According to one embodiment, the use of potassium hydroxide allows the formation of the monopotassium salt, the dipotassium salt or the tripotassium salt of spiculisporic acid.

According to another embodiment, the base is an amino acid, and in particular is arginine. In the context of the invention, and unless otherwise mentioned, the ratio $R_1$ corresponds to the ratio of the number of moles of base to the number of moles of spiculisporic acid. It is thus a mole ratio. Mention may be made, for example, of a mole ratio $R_1$ strictly greater than 1 and preferably less than or equal to 2.5. Thus, a mole ratio $R_1$ strictly greater than 1 corresponds to a number of moles of base strictly greater than the number of moles of spiculisporic acid.

According to one embodiment, the ratio $R_1$ is strictly greater than 1. Preferably, the ratio $R_1$ is between 1 and 2.5.

According to a particular embodiment, the ratio $R_1$ is equal to 1.

According to this embodiment, the use of one mole of base makes it possible to neutralize one of the two carboxylic functions of said acid without breaking the lactone function.

According to another particular embodiment, the ratio $R_1$ is equal to 2.

According to one embodiment, the use of two moles of base makes it possible to neutralize the two carboxylic functions of said acid without breaking the lactone function.

Preferably, one mole of base is used per mole of spiculisporic acid in the cosmetic compositions of the present invention, and the spiculisporic acid is in the form of a mono-salt.

According to the invention, the pH of the composition according to the invention may be between 4 and 8. Preferably, the pH is between 4.5 and 7 and in particular between 5 and 6.

According to the invention, the content of non-neutralized spiculisporic acid introduced into the composition may range from 0.1% to 15%, preferably from 0.5% to 10% and preferentially from 0.8% to 5% by mass relative to the total mass of the composition.

Alkyl Polyglycoside Nonionic Surfactants

For the purposes of the present invention, the term "alkyl polyglycoside" means an alkylmonosaccharide (degree of polymerization 1) or an alkyl polysaccharide (degree of polymerization greater than 1).

The alkyl polyglycosides may be used alone or in the form of mixtures of several alkylpolyglycosides. They generally correspond to formula (II) below:

in which:
the radical R denotes a linear or branched alkyl radical including from 8 to 30 carbon atoms, preferably from 8 to 24 carbon atoms, even more preferentially from 8 to 18 carbon atoms, better still from 10 to 16 carbon atoms and even better still from 10 to 12 carbon atoms; the group G is a saccharide residue;
a is a number ranging from 1 to 10, preferably from 1 to 5 and especially from 1.2 to 3.

Examples of alkyl polyglycosides that may be mentioned include decyl glucoside, for instance the product sold under the name Mydol 10® by the company Kao Chemicals or the product sold under the name Plantacare 2000 UP® by the company Henkel or the product sold under the name Oramix NS 10® by the company SEPPIC; caprylyl/capryl glucoside, for instance the product sold under the name Plantacare KE 3711® by the company Cognis or Oramix CG 110® by the company SEPPIC; lauryl glucoside, for instance the product sold under the name Plantacare 1200 UP® by the company Henkel or Plantaren 1200 N® by the company Henkel; cetearyl glucoside optionally as a mixture with cetostearyl alcohol, for example sold under the name Montanov 68 by the company SEPPIC, under the name Tego Care CG90 by the company Evonik Goldschmidt and under the names Emulgade PL1618 or Emulgade KE 3302 by the company Cognis; cocoyl glucoside, for instance the product sold under the name Plantacare 818 UP® by the company Henkel; methyl cocoyl glucoside sold under the name Eumulgin GTS by the company Cognis; octyldodecyl xyloside sold, for example, under the names Fluidanov 20X or Easynov by the company SEPPIC; caprylyl glucoside, for instance the product sold under the name Plantacare 810 UP® by the company Cognis.

The alkyl polyglycoside may be used as a mixture with at least one fatty alcohol, especially a fatty alcohol containing from 10 to 30 carbon atoms and more particularly from 12 to 22 carbon atoms.

For example, it is possible to use in combination a fatty alcohol and an alkyl polyglycoside whose alkyl part is identical to that of the selected fatty alcohol.

The fatty alcohol/alkyl polyglycoside emulsifying mixtures as defined above are known per se. They are described especially in patent applications WO92/06778, WO95/13863 and WO98/47610 and prepared according to the preparation processes indicated in these documents.

Among the particularly preferred fatty alcohol/alkyl polyglycoside mixtures, mention may be made of the products sold by the company SEPPIC under the name Montanov®, such as the following mixtures:
cetylstearyl alcohol/cocoyl glucoside—Montanov 82®
arachidyl alcohol and behenyl alcohol/arachidyl glucoside—Montanov 802®
myristyl alcohol/myristyl glucoside—Montanov 14®
cetylstearyl alcohol/cetylstearyl glucoside—Montanov 68®
$C_{14}$-$C_{22}$ alcohol/$C_{12}$-$C_{20}$ alkylglucoside—Montanov L®
cocoyl alcohol/cocoyl glucoside—Montanov S®
isostearyl alcohol/isostearyl glucoside—Montanov WO 18®.

According to a particular embodiment of the invention, the radical R denotes a linear or branched, preferably linear, alkyl radical including from 8 to 18 carbon atoms, preferably from 8 to 12 carbon atoms.

According to another particular embodiment of the invention, $(G)_a$ is a glucoside group comprising from 1 to 5 and especially 1.2 to 3 glucoside units.

The saccharide residue may be chosen from glucose, dextrose, saccharose, fructose, galactose, maltose, maltotriose, lactose, cellobiose, mannose, ribose, dextran, talose, allose, xylose, levoglucan, cellulose and starch. More preferentially, the saccharide residue denotes glucose.

It should also be noted that each unit of the polysaccharide part of the alkyl polyglycoside may be in α or β isomer form, in L or D form, and the configuration of the saccharide residue may be of furanoside or pyranoside type.

It is, of course, possible to use mixtures of alkyl polysaccharides, which may differ from each other in the nature of the borne alkyl unit and/or the nature of the bearing polysaccharide chain.

According to a particular embodiment of the invention, the alkyl polyglucoside(s) are chosen from caprylyl/capryl glucoside, decyl glucoside, lauryl glucoside and cocoyl glucoside. Preferably, they are chosen from caprylyl/capryl glucoside, decyl glucoside and cocoyl glucoside. Even more preferentially, it is caprylyl/capryl glucoside.

The alkyl polyglucoside(s) may be present in the composition in accordance with the invention in an active material (AM) content ranging from 0.5% to 30% by weight, preferably from 1% to 25% by weight, even more preferentially from 1.5% to 20% by weight and better still from 2% to 15% by weight relative to the total weight of the composition.

According to one embodiment, the mass ratio $R_2$ of the mass of surfactants chosen from alkyl polyglycosides to the mass of spiculisporic acid is less than or equal to 12.5.

According to another embodiment, the mass ratio $R_2$ is between 0.1 and 12.5. In particular, the mass ratio $R_2$ is between 1 and 5. Preferably, the mass ratio $R_2$ is between 1 and 2.

Polysaccharides

In general, the polysaccharides according to the invention may be chosen from polysaccharides produced by microorganisms; polysaccharides isolated from algae, and higher plant polysaccharides, such as homogeneous polysaccharides, in particular celluloses and derivatives thereof or fructosans, heterogeneous polysaccharides such as gum arabics, galactomannans, glucomannans and pectins, and derivatives thereof.

In particular, the polysaccharides may be chosen from fructans, gellans, glucans, amylose, amylopectin, glycogen, pullulan, dextrans, celluloses and derivatives thereof, in particular methylcelluloses, hydroxyalkylcelluloses, ethylhydroxyethylcelluloses and carboxymethylcelluloses, mannans, xylans, lignins, arabans, galactans, galacturonans, alginate-based compounds, chitin, chitosans, glucuronoxylans, arabinoxylans, xyloglucans, glucomannans, pectic acids and pectins, arabinogalactans, carrageenans, agars, hyaluronic acid, glycosaminoglucans, gum arabics, tragacanth gums, ghatti gums, karaya gums, locust bean gums, galactomannans such as guar gums and nonionic derivatives thereof, in particular hydroxypropyl guar, and ionic derivatives thereof, biopolysaccharide gums of microbial origin, in particular scleroglucan or xanthan gums, mucopolysaccharides, and in particular chondroitin sulfates, and mixtures thereof.

Xanthan gums have a molecular weight of between 1 000 000 g/mol and 50 000 000 g/mol and a viscosity of between 0.6 and 1.65 Pa·s for an aqueous composition containing 1% of xanthan gum (measured at 25° C. on a Brookfield viscometer of LVT type at 60 rpm).

Xanthan gums are represented, for example, by the products sold under the names Rhodicare by the company Rhodia Chimie, under the name Satiaxane™ by the company Cargill Texturizing Solutions (for the food, cosmetic and pharmaceutical industries), under the name Novaxan™ by the company ADM, and under the names Kelzan® and Keltrol® by the company CP-Kelco.

These polysaccharides may be chemically modified, especially with urea or urethane groups or by hydrolysis, oxidation, esterification, etherification, sulfation, phosphatation, amination, amidation or alkylation reaction, or by several of these modifications.

The derivatives obtained may be anionic, cationic, amphoteric or nonionic.

Advantageously, the polysaccharides may be chosen from carrageenans, in particular kappa-carrageenan, gellan gum, agar-agar, xanthan gum, alginate-based compounds, in particular sodium alginate, scleroglucan gum, guar gums and nonionic derivatives thereof, hyaluronic acid, inulin, pullulan and pectin, and mixtures thereof.

In general, the compounds of this type that may be used in the present invention are chosen from those described especially in Kirk-Othmer's *Encyclopedia of Chemical Technology*, Third Edition, 1982, volume 3, pp. 896-900, and volume 15, pp. 439-458, in *Polymers in Nature* by E. A. MacGregor and C. T. Greenwood, published by John Wiley & Sons, Chapter 6, pp. 240-328, 1980, in the book by Robert L. Davidson entitled *Handbook of Water-Soluble Gums and Resins* published by McGraw-Hill Book Company (1980) and in *Industrial Gums—Polysaccharides and their Derivatives*, edited by Roy L. Whistler, Second Edition, published by Academic Press Inc.

According to a particular embodiment of the invention, the polysaccharide(s) are chosen from pectin, alginate-based compounds, in particular sodium alginate, guar gums and nonionic derivatives thereof such as hydroxypropyl guar, pullulan and hyaluronic acid, preferably pectin, alginate-based compounds, in particular sodium alginate, guar gums and nonionic derivatives thereof such as hydroxypropyl guar, even more preferentially pectin and alginate-based compounds, in particular sodium alginate.

According to a particular embodiment, the polysaccharide(s) are present in the composition in accordance with the invention in an amount of between 0.1% and 10% by weight, preferably between 0.1% and 5% by weight and even more preferentially between 0.1% and 2% by weight relative to the total weight of the composition.

Additional Surfactants

The composition according to the invention may comprise, besides spiculisporic acid and the alkyl polyglycosides, at least one "additional" surfactant. The additional surfactants used in the composition according to the invention may be chosen from nonionic, amphoteric or zwitterionic, anionic and cationic surfactants. According to a particular embodiment, they are chosen from nonionic, amphoteric and anionic surfactants. Preferably, they are chosen from nonionic surfactants and anionic surfactants.

Reference may be made to Kirk-Othmer, "Encyclopedia of Chemical Technology", volume 22, pages 333-432, 3rd edition, 1979, Wiley, for the definition of the properties and (emulsifying) functions of surfactants, in particular pages 347-377 of said reference, for the anionic, amphoteric and nonionic surfactants.

According to a particular embodiment, the additional surfactant(s) are foaming surfactants. Foaming surfactants are detergents and differ from emulsifying surfactants by their HLB (hydrophilic lipophilic balance) value, the HLB being the ratio between the hydrophilic part and the lipophilic part in the molecule. The term "HLB" is well known to those skilled in the art and is described, for example, in "The HLB system. A time-saving guide to Emulsifier Selection" (published by ICI Americas Inc.; 1984).

For emulsifying surfactants, the HLB generally ranges from 3 to 8 for the preparation of water-in-oil (W/O) emulsions and from 8 to 18 for the preparation of oil-in-water (O/W) emulsions, whereas foaming surfactants generally have an HLB of greater than 18 and better still greater than 20.

In particular, the additional surfactant(s) may be chosen from the following surfactants:

a) Anionic Surfactants

The anionic surfactants may be chosen, for example, from soaps (fatty acid salts), carboxylates for instance sulfosuccinates, acylamino acids, amido ether carboxylates, alkyl polyaminocarboxylates, isethionates, alkyl methyl taurates and alkyl phosphates (monoalkyl or dialkyl phosphates), salts thereof, and mixtures thereof.

The soaps are obtained from a fatty acid which is partially or completely saponified (neutralized) with a basic agent. These are alkali metal or alkaline-earth metal soaps or soaps of organic bases. Use may be made, as fatty acids, of saturated, linear or branched fatty acids including from 8 to 30 carbon atoms and preferably including from 8 to 22 carbon atoms. This fatty acid may be chosen in particular from palmitic acid, stearic acid, myristic acid and lauric acid, and mixtures thereof.

Examples of basic agents that may be used include alkali metal hydroxides (sodium hydroxide and potassium hydroxide), alkaline-earth metal hydroxides (for example magnesium hydroxide), ammonium hydroxide or else organic bases, such as triethanolamine, N-methylglucamine, lysine and arginine.

The soaps may especially be fatty acid alkali metal salts, the basic agent being an alkali metal hydroxide and preferably potassium hydroxide (KOH).

The amount of basic agent must be sufficient for the fatty acid to be at least partially neutralized.

Carboxylates that may especially be mentioned include alkyl glycol carboxylic acids (or 2-(2-hydroxyalkyloxyacetic acids)) and salts thereof, for instance sodium lauryl glycol carboxylate, sold under the names Beaulight Shaa® or Beaulight LCA-25N® by the company Sanyo (CTFA name: sodium lauryl glycol carboxylate), or its corresponding acid form sold under the name Beaulight Shaa (Acid Form)® by the company Sanyo.

Non-oxyalkylenated alkyl sulfosuccinates that may be mentioned include lauryl alcohol sulfosuccinates (70/30 C12/C14) (disodium lauryl sulfosuccinate) such as the products sold under the name Rewopol® SB F 12 P by the company Evonik Goldschmidt, Kohacool L-40 by the company Toho Chemical, or Mackanate LO-FF by the company Rhodia.

Oxyalkylenated sulfosuccinates that may be mentioned include oxyethylenated lauryl alcohol sulfosuccinates (70/

30 C12/C14) (Disodium laureth sulfosuccinate) such as the products sold under the names Setacin 103 Special NP® by the company Zschimmer & Schwarz, Rewopol SB FA 30 U by the company Evonik Goldschmidt, Goodway MES by the company Shanghai Goodway Chemical, Rewopol SB FA 30 PH by the company Evonik Goldschmidt, Alkonix SS K by the company Ultra-Oxiteno, Disodium laureth sulfosuccinate by the company Guangzhou Flower's Song Fine Chemical, Kohacool L-300 by the company Toho Chemical, Empicol SDD OF by the company Huntsman, the disodium salt of a hemisulfosuccinate of C12-C14 alcohols, sold under the name Setacin F Special Paste® by the company Zschimmer & Schwarz, the oxyethylenated (2 EO) disodium oleamidosulfosuccinate sold under the name Standapol SH 135® by the company Cognis, the oxyethylenated (5 EO) laurylamide monosulfosuccinate sold under the name Lebon A-5000® by the company Sanyo, the oxyethylenated (10 EO) disodium salt of lauryl citrate monosulfosuccinate sold under the name Rewopol SB CS 50® by the company Witco, and the ricinoleic monoethanolamide monosulfosuccinate sold under the name Rewoderm S 1333® by the company Witco. Polydimethylsiloxane sulfosuccinates may also be used, such as the disodium PEG-12 dimethicone sulfosuccinate sold under the name Mackanate-DC30® by the company MacIntyre.

Examples of acylamino acids that may be mentioned include sodium cocoylglycinate sold by the company Ajinomoto under the name Amilite GCS 12, sodium lauroyl glutamate sold by the company Ajinomoto under the name Amisoft LS11 and sodium lauroyl sarcosinate sold by the company SEPPIC under the name Oramix L30.

An example of an alkyl phosphate that may be mentioned is lauryl phosphate, sold by the company Kao under the name MAP 20.

The amount of anionic surfactants (as active material) preferably ranges from 0.1% to 15% by weight, better still from 0.5% to 10% by weight and even better still from 0.5% to 5% by weight relative to the total weight of the composition.

Preferably, the anionic surfactant is chosen from:
acylamino acids, for example the sodium cocoyl glycinate sold by the company Ajinomoto under the name Amilite GCS 12, the sodium lauroyl glutamate sold by the company Ajinomoto under the name Amisoft LS11 and the sodium lauroyl sarcosinate sold by the company SEPPIC under the name Oramix L 30, and in particular sodium cocoyl glycinate, and mixtures thereof.

b) Amphoteric Surfactants

The amphoteric surfactants may be chosen from betaine derivatives. The term "amphoteric" includes here both amphoteric surfactants and zwitterionic surfactants.

Examples of betaine derivatives that may be mentioned include cocoyl betaine, for instance the product sold under the name Dehyton AB-30® by the company Cognis; lauryl betaine, for instance the product sold under the name Genagen KB® by the company Clariant; oxyethylenated (10 EO) lauryl betaine, for instance the product sold under the name Lauryl ether (10 EO) Betaine® by the company Shin Nihon Rica; oxyethylenated (10 EO) stearyl betaine, for instance the product sold under the name Stearyl ether (10 EO) Betaine® by the company Shin Nihon Rica; the cocamidopropyl betaine sold, for example, under the name Velvetex BK 35® by the company Cognis; the undecylenamidopropyl betaine sold, for example, under the name Amphoram U® by the company Ceca; and mixtures thereof. The amphoteric surfactant is present in a solids content of less than 2.5% by weight and preferably less than or equal to 2% by weight, relative to the total weight of the composition. Above an active material content of greater than 2.5% of amphoteric surfactant, destabilization of the aqueous gel is observed.

The amount of amphoteric surfactant(s) (as active material) may range from 0.1% to 2.5% by weight and better still from 0.5% to 2% by weight, relative to the total weight of the composition.

c) Nonionic Surfactants

The composition according to the invention may also comprise a nonionic surfactant chosen, for example, from maltose esters, polyglycerolated fatty alcohols, and glucamine derivatives such as 2-ethylhexyloxycarbonyl-N-methylglucamine, and mixtures thereof.

The maltose derivatives are, for example, those described in document EP-A-566 438, such as O-octanoyl-6'-D-maltose or O-dodecanoyl-6'-D-maltose described in document FR-2 739 556.

Among the polyglycerolated fatty alcohols that may be mentioned is polyglycerolated dodecanediol (3.5 mol of glycerol), this product being sold under the name Chimexane NF® by the company Chimex.

Nonionic surfactants that may also be used include PEG-120 methylglucose dioleate, for instance Glucamate DOE 120 from the company Noveon or PEG-150 pentaerythrityl tetrastearate, for instance Crothix from the company Croda.

The amount of nonionic surfactants (as active material) preferably ranges from 0.1% to 10% by weight, better still from 1% to 5% by weight and better still from 1% to 3% by weight relative to the total weight of the composition.

According to a particular embodiment of the invention, the total amount of surfactant active material in the composition is between 1% and 40% by weight, preferably between 3% and 35% by weight, even more preferentially between 5% and 30% by weight and better still between 7% and 20% by weight relative to the total weight of the composition.

According to a particular embodiment, the composition according to the invention is free of sulfate surfactants and of amphoteric surfactants. For the purposes of the present invention, the expression "free of sulfate surfactants and of amphoteric surfactants" means a composition comprising an amount of sulfate surfactants and of amphoteric surfactants between 0 and 1% by weight and preferably between 0 and 0.5% by weight, relative to the total weight of the composition.

According to a particular embodiment, the composition according to the invention comprises less than 1% and preferably less than 0.5% of additional surfactants other than spiculisporic acid and the alkyl polyglycosides, and in particular is free of additional surfactants other than spiculisporic acid and the alkyl polyglycosides.

According to a particular embodiment, the composition comprises spiculisporic acid and the alkyl polyglycosides as major surfactants. Preferably, the composition in accordance with the invention comprises as sole surfactants spiculisporic acid and the alkyl polyglycosides. In the context of the present invention, the term "major surfactant" means that, in the case where the composition contains additional surfactants other than spiculisporic acid and the alkyl polyglycosides, said additional surfactants are always present in a total weight amount less than the total weight amount of spiculisporic acid and of the alkyl polyglycosides.

Aqueous Phase

The composition according to the invention comprises an aqueous phase.

According to a particular embodiment, the composition in accordance with the invention includes an amount of water of at least 40% by weight, preferably ranging from 40% to 95% by weight and better still from 50% to 90% by weight, relative to the total weight of the composition.

The water used may be sterile demineralized water and/or a floral water such as rose water, cornflower water, camomile water or lime blossom water, and/or a natural spring water or mineral water, for instance: Vittel water, Vichy basin water, Uriage water, La Roche-Posay water, Bourboule water, Enghien-les-Bains water, Saint-Gervais-les-Bains water, Néris-les-Bains water, Allevar-les-Bains water, Digne water, Maizières water, Neyrac-les-Bains water, Lons-le-Saunier water, Eaux-Bonnes water, Rochefort water, Saint Christau water, Fumades water, Tercis-les-Bains water and Avène water. The aqueous phase may also comprise reconstituted spring water, i.e. a water containing trace elements such as zinc, copper, magnesium, etc., reconstituting the characteristics of a spring water.

The aqueous (or hydrophilic) phase of the composition according to the invention may also contain any water-soluble or water-dispersible additive. Water-soluble additives that may especially be mentioned are polyols comprising from 2 to 8 carbon atoms. The term "polyol" should be understood as meaning any organic molecule including at least two free hydroxyl groups. Examples of polyols that may be mentioned include glycerol, glycols, for instance butylene glycol, propylene glycol, isoprene glycol, dipropylene glycol, hexylene glycol, polyethylene glycols and polypropylene glycol. According to a particular embodiment of the invention, the polyol is chosen from glycerol and hexylene glycol. Preferably, the polyol is glycerol.

Water-soluble additives that may also be mentioned include primary alcohols, i.e. an alcohol including from 1 to 6 carbon atoms, such as ethanol and isopropanol. It is preferably ethanol. The addition of such an alcohol may especially be suitable when the composition according to the invention is used as a product for the body or the hair.

The amount of water-soluble or water-dispersible additives in the composition of the invention may range, for example, from 0 to 50% by weight, preferably from 0.5% to 30% by weight and even more preferentially from 2% to 20% by weight, relative to the total weight of the composition.

The compositions of the invention may contain adjuvants normally used in the cosmetics field and especially those used in cleansing products. Examples of adjuvants that may be mentioned include fragrances, preserving agents, sequestrants (EDTA), pigments, nacres, mineral or organic, matt-effect, whitening or exfoliant fillers, soluble dyes, sunscreens, cosmetic or dermatological active agents such as water-soluble or liposoluble vitamins, antiseptics, antiseborrhoeic agents, antimicrobials, such as benzoyl peroxide, salicylic acid, triclosan, azelaic acid, and also optical brighteners, nonionic polymers, such as polyvinylpyrrolidone (PVP), anionic polymers, conditioning amphoteric polymers such as polyquaternium products, for instance Polyquaternium-47 sold under the reference Merquat 2001 by the company Nalco, and fatty substances that are incompatible with the aqueous medium, for instance oils and waxes. The amounts of these various adjuvants are those conventionally used in the field under consideration, for example from 0.01% to 25% of the total weight of the composition. These adjuvants and the concentrations thereof must be such that they do not modify the property desired for the composition of the invention.

Active agents that may be mentioned include any care or cleansing active agent usually used in cosmetics, and in particular antibacterial agents such as octopirox and triclosan, keratolytic agents such as salicylic acid, lactic acid or glycolic acid, salicylic acid derivatives such as 5-n-octanoylsalicylic acid, essential oils, fruit waters (for example from apple or grape) or floral waters (for example rose water), plant extracts (especially from tea, mint, orchid or soybean), mineral salts (for example zinc or copper salts), vitamins such as vitamin C (ascorbic acid), vitamin A (retinol), vitamin E, vitamin PP (niacinamide) and vitamin B3 (panthenol), and derivatives thereof.

Fillers that may be mentioned include mineral fillers such as talc or magnesium silicate (particle size: 5 microns) sold under the name Luzenac 15 M00® by the company Luzenac, kaolin or aluminium silicate, for instance the product sold under the name Kaolin Supreme® by the company Imerys, or organic fillers such as starch, for instance the product sold under the name Amidon de Maïs B® by the company Roquette, Nylon microspheres such as those sold under the name Orgasol 2002 UD Nat Cos® by the company Atochem, expanded microspheres based on vinylidene chloride/acrylonitrile/methacrylonitrile copolymer containing isobutane, such as the products sold under the name Expancel 551 DE® by the company Expancel. Fibres, for instance nylon fibres (Polyamide 0.9 Dtex 0.3 mm sold by Etablissements Paul Bonte), or cellulose or "Rayon" fibres (Rayon Flock RCISE N0003 MO4® sold by the company Claremont Flock Corporation), may also be added to the composition of the invention.

According to a particular embodiment, the composition according to the invention contains, as fillers, exfoliant particles that will allow scrubbing of the skin. Use may be made, as exfoliant particles, of exfoliant or scrubbing particles of mineral, plant or organic origins. Thus, it is possible to use, for example, polyethylene beads or powder, such as those sold under the name Microthene MN 727 or Microthene MN 710-20 by the company Equistar or such as the powder sold under the name Gotalene 120 Incolore 2 by the company Dupont; Nylon particles, such as those sold by the company Arkema under the name Orgasol 2002 Exd Nat Cos; fibres such as polyamide fibres, such as those sold by the company Utexbel under the name Pulpe Polyamide 12185 Taille 0.3 mm; polyvinyl chloride powder; pumice stone (INCI name: pumice) such as pumice 3/B from Eyraud; ground shells of fruit kernels, such as ground apricot kernels or walnut shells; sawdust; glass beads; alumina (aluminium oxide) (INCI name: Alumina), such as the product sold under the name Dermagrain 900 by the company Marketech International; sugar crystals; beads which melt during application on the skin, for instance the spheres based on mannitol and cellulose sold under the Unispheres names by the company Induchem, the agar-based capsules sold under the Primasponge names by the company Cognis and the spheres based on jojoba esters sold under the Floraspheres names by the company Floratech; diatomaceous earth frustules such as those sold by the company Alban Muller under the reference Diatami 60/200 microns, and polyethylene wax particles, for instance those sold by the company Sasol under the name Cirebelle.

According to a particular embodiment, the composition in accordance with the invention may be in the form of an aqueous gel.

According to another particular embodiment, the composition of the invention is in the form of a micellar water.

The composition in accordance with the invention may have a viscosity at room temperature (25° C.) which varies within a broad range, for example a viscosity ranging from 0.01 to 500 poises, and preferentially between 0.01 and 10 poises. The viscosity is measured with a Rheomat 180 at 25° C., with spindles suitable for the viscosity, in particular spindle No. 2.

The aqueous composition, before it is dispensed, may be packaged in a foam dispenser or a foam pump, especially a non-aerosol foam dispenser or foam pump, allowing said composition to be dispensed in foam form, especially non-aerosol foam form.

The composition may be dispensed from a container by means of a mechanical pump connected to a dispensing head, the passage of the composition into the dispensing head converting it into a foam at the latest at the outlet orifice of said head.

The composition may also be contained in a foam dispenser of pump bottle type. This type of dispenser comprises, in addition to a container and an optional push-button, a dispensing head for delivering the composition, a pump and a dip tube for transferring the composition from the container into the head in order to deliver the product. The foam is formed by forcing the composition to pass through a material comprising a porous substance such as a sintered material, a filtering grid made of plastic or of metal, or similar structures.

Such dispensers are well known to those skilled in the art and are described in particular in patents U.S. Pat. No. 3,709,437 (Wright), U.S. Pat. No. 3,937,364 (Wright), U.S. Pat. No. 4,022,351 (Wright), U.S. Pat. No. 41,147,306 (Bennett), U.S. Pat. No. 4,184,615 (Wright), U.S. Pat. No. 4,598,862 (Rice), U.S. Pat. No. 4,615,467 (Grogan et al.), and U.S. Pat. No. 5,364,031 (Tamiguchi et al.).

The composition may be packaged in a container closed by a closing member. The closing member may be a pump-dispensing mechanism, in particular the dispensing head. This dispensing head preferably includes a mechanical pump held in a ring intended for mounting by snap-fitting or screwing onto the neck of the container containing the mixture. The pump preferably includes a pump body connected to a dip tube in order to enable the whole of the mixture to be dispensed. The pump preferably also includes a push-button for activation of the pump body, such that, on each activation, a dose of composition is sucked inside the dip tube and ejected in foam form out of the dispensing orifice of the head.

The containers are preferentially made of a thermoplastic material, and obtained via extrusion blow-moulding or injection blow-moulding processes. In particular, the container intended for packaging the composition may be made of a material including a non-zero proportion of EVOH. The pump is, for example, the "F2-L9" standard model or the WRT4 model sold by the company Rexam.

Preferably, the foam dispenser may comprise or be constituted of, in addition to a container, a dip tube, a pump and an optional push-button. During the release of the product, a composition in foam form may be generated by incorporation of air into the aqueous, advantageously liquid, composition.

The composition according to the invention is thus, on application to the keratin materials, in the form of a foam, especially a non-aerosol foam, which can be generated by means of a dispenser which introduces air into an aqueous, generally liquid, composition at the time of release of the product (self-foaming device).

A subject of the invention is also a device for the cosmetic treatment of keratin materials, especially the skin, comprising:

a foaming cleansing composition in the form of an aqueous gel comprising spiculisporic acid, at least one base, at least one nonionic surfactant chosen from alkyl polyglycosides, and at least one polysaccharide, in which the ratio R1 of the number of moles of base to the number of moles of spiculisporic acid is strictly greater than 1; and a foam dispenser for dispensing said composition in the form of a foam, especially a non-aerosol foam.

The device may be a multi-compartment device, especially a device containing two compartments; preferably, the device comprises only one compartment.

The composition in foam form may be rinsed out or left in after it has been applied; preferably, it is rinsed out.

The compositions according to the invention may especially constitute cleansing or makeup-removing products for the skin (body, face, eyes), the scalp and/or the hair, preferably products for cleansing or removing makeup from the skin (body, face, eyes).

Another subject of the invention is a cosmetic process for treating keratin materials, in particular a process for cleansing or removing makeup from keratin materials such as the skin, including the scalp, keratin fibres such as the eyelashes, the hair, and/or the lips, characterized in that a composition as defined above is applied to said keratin materials. According to a particular embodiment, it is a process for cleansing or removing makeup from the skin.

Another subject of the invention is constituted of the cosmetic use of the composition as defined above, as a product for cleansing and/or removing makeup from keratin materials.

The compositions according to the invention may also constitute a composition for treating greasy skin and/or for disinfecting the skin and/or the scalp, especially when they contain an antibacterial agent. In particular, specific active agents for treating greasy skin may be included, for instance salicylic acid, azelaic acid, triclosan, piroctone olamine or niacinamide (vitamin PP).

Another subject of the invention is the use of the composition as defined above for the preparation of a composition for treating greasy skin and/or for disinfecting the skin and/or the scalp.

Another subject of the invention consists of a cosmetic process for cleansing keratin materials, in which the composition of the invention is applied to keratin materials in the presence of water, and the foam formed and the soiling residues are removed by rinsing with water.

In the case of cleansing the face, the composition according to the invention may constitute a mask which is rinsed off after a leave-on time of 1 to 3 minutes.

The examples that follow serve to illustrate the invention without, however, being limiting in nature. The amounts indicated are weight percentages of starting material (SM), unless otherwise mentioned.

EXAMPLES

The examples below are performed on a neutral support of SkinFX type, which is an in vitro support mimicking the relief and biomechanical properties of the skin, generally made of silicone gum on which is superposed a very thin layer of polyurethane. Various colours exist, similar to the various skin colours existing in the world.

Protocol for Evaluating the Makeup-Removing Power

The makeup-removing power of the various test compositions is evaluated in the following manner.

The tests are performed on thick white SkinFX (reference SKINFX-SH-H40-BAK-WHI). The foundation used is the "Infaillible 24 h tenue et confort teinte 220" foundation from L'Oréal Paris.

The surface of the SkinFX is cleansed and dried. The naked surface is then measured by colorimetry (measurements of L, a and b for three zones).

14 µl of foundation are then applied to the surface to be freed of makeup. The foundation is applied by finger by performing 15 passes of 15 seconds over the surface to be freed of makeup. The SkinFX is dried at 32° C. for 15 minutes on a hotplate. The made-up surface is then measured by colorimetry (measurements of L, a and b for three zones).

0.4 g of foam is generated using a self-foaming device and applied to the surface to be freed of makeup. The foam is sheared by finger for 20 seconds. A pad of cotton wool soaked with 2 ml of water is then passed over the surface, followed by a second pad of cotton wool also soaked with 2 ml of water. The colorimetric measurement is taken on the SkinFX to measure the amount of foundation remaining (measurements of L, a and b for three zones). The value making it possible to evaluate the makeup-removing power of a composition is the percentage of makeup removal ($\Delta E/\Delta E max$)*100 calculated as indicated below.

Calculation of the Percentage of Makeup Removal
1) Colorimetric Difference of the Made-Up Skin Relative to the Naked Skin=$\Delta E max$:

$$\Delta E\ max = \sqrt{(\Delta a_1^2 + \Delta b_1^2 + \Delta L_1^2)} \text{ with}$$

$\Delta a_1 = a$ naked skin$-a$ made-up skin $\Delta b_1 = b$ naked skin$-b$ made-up skin $\Delta L_1 = L$ naked skin$-L$ made-up skin 2) Colorimetric Difference of the Makeup-Removed Skin Relative to the Made-Up Skin=$\Delta E$:

$$\Delta E = \sqrt{(\Delta a_2^2 + \Delta b_2^2 + \Delta L_2^2)} \text{ with}$$

$\Delta a_2 = a$ makeup-removed skin$-a$ made-up skin $\Delta b_2 = b$ makeup-removed skin$-b$ made-up skin $\Delta L_2 = L$ makeup-removed skin$-L$ made-up skin The mean percentage of makeup removal corresponds to the mean of the three values of ($\Delta E/\Delta E max$)*100 for a given makeup-removing product.

Protocol for Evaluating the Foam Properties

The foam texture is measured according to the following protocol:

The foams are prepared using a self-foaming device containing the formulations to be evaluated, by exerting four successive presses so as to generate a sufficient volume of foam for the measurement. The container is then levelled off using a spatula so as to have a surface that is as uniform as possible.

The texture of the foams obtained with the test compositions is characterized using a TA.XT.plus texturometer from Stable Micro System, equipped with a head which can detect a maximum force of 50 N. The geometry used is a polycarbonate A/BE cell, constituted of a cylindrical container (height=70 mm, diameter=50 mm) and a disc (height=5 mm, diameter=45 mm) connected to the measuring head via a metal stem. The measurements are taken by back-extrusion, a force as a function of time is recorded, corresponding to the outward cycles (penetration of the module into the sample) and to the return cycle (extraction of the module from the sample). The following parameters are extracted from these curves: maximum outward force or firmness, area under the outward curve or consistency, maximum extraction force or cohesion force and area under the extraction curve or viscosity index. The recording parameters for these curves are as follows: pre-test speed of 2 mm/s, test speed of 1 mm/s, post-test speed equal to that of the test, and depth of penetration into the sample of 8 mm.

The options selected for this measuring method are the following:

Test mode: Compression measurement;
Test speed 1.0 mm/s;
Temperature 20° C.±1° C.

The results presented correspond to the mean value of the area under the outward curve for the two measurements taken on each composition.

Comparative Examples

The following compositions are produced.

| | Composition | | | | |
|---|---|---|---|---|---|
| | 1 (invention) | 2 (invention) | 3 (invention) | 4 (invention) | 5 (invention) |
| Spiculisporic acid, sold by Iwata Chemicals | 0.8 | 0.8 | 0.8 | 0.8 | 0.8 |
| L-Arginine, sold by Ajinomoto | 0.7 | 0.7 | 0.7 | 0.7 | 0.7 |
| (50/50 C8/C10)alkyl polyglucoside as a buffered 60% aqueous solution (Oramix CG 110 from SEPPIC) | 1.7 | 1.7 | 1.7 | 1.7 | 1.7 |
| Glycerol | 1 | 1 | 1 | 1 | 1 |
| 1,3-Propanediol | 3 | 3 | 3 | 3 | 3 |
| Demineralized water | qs 100 | qs 100 | qs 100 | qs 100 | qs 100 |
| Pectin (Unipectine OF 600 C SB from Cargill) | 2 | — | — | — | — |
| Sodium alginate (poly mannuronate and guluronate) (Protanal PH6160 from FMC Corporation) | — | 0.25 | — | — | — |

-continued

| | Composition | | | | |
|---|---|---|---|---|---|
| | 1 (invention) | 2 (invention) | 3 (invention) | 4 (invention) | 5 (invention) |
| Hydroxypropyl guar (Jaguar HP105 from Solvay) | — | — | 0.5 | — | — |
| Pullulan (Pullulan Cosmetic Grade from Haya Shibara) | — | — | — | 2 | — |
| Sodium hyaluronate (MW: 1 100 000) powder | — | — | — | — | 0.1 |

| | Composition | |
|---|---|---|
| | 6 (comparative) | 7 (comparative) |
| Spiculisporic acid, sold by Iwata Chemicals | 0.8 | 1.8 |
| L-Arginine, sold by Ajinomoto | 0.7 | 1.6 |
| (50/50 C8/C10)alkyl polyglucoside as a buffered 60% aqueous solution (Oramix CG 110 from SEPPIC) | 1.7 | — |
| Glycerol | 1 | 1 |
| 1,3-Propanediol | 3 | 3 |
| Demineralized water | qs 100 | qs 100 |

Composition Preparation Method:

Compositions 1 to 7 were all prepared according to the same procedure at room temperature. Spiculisporic acid is weighed out and added to water with mechanical stirring using a Rayneri blender (300 rpm). A dispersion is obtained. The amount of arginine required to form the spiculisporic acid mono-salt (preferentially 1.1 equivalents) is added, and the mixture is stirred for 10 minutes until the two compounds have totally dissolved. Finally, the alkyl polyglycoside is added with stirring until fully dissolved. The polysaccharide is added at the end of manufacture, with continued stirring. The stirring needs to be kept low to prevent the mixture from foaming during the manufacture.

Compositions 1, 2, 6 and 7 are evaluated in terms of makeup removal. The results obtained are as follows:

| Formulation No. | L | a | b | % makeup removal |
|---|---|---|---|---|
| Naked SkinFX | 96.39 | −0.6 | 4 | |
| Made-up SkinFX | 69.6 | 15.05 | 31.02 | 0 |
| Composition 7 (comparative) | 79.94 | 9.78 | 23.41 | 33.7 |
| Composition 6 (comparative) | 84.67 | 6.08 | 17.12 | 54.4 |
| Composition 1 (invention) | 89.52 | 3.94 | 14.57 | 68.4 |
| Composition 2 (invention) | 87.12 | 5.21 | 16.3 | 60.5 |

These results show that spiculisporic acid alone functions only moderately in terms of makeup removal. When it is combined with an alkyl polyglycoside, with an equal concentration of emulsifiers, the makeup-removing results are improved. When the composition also comprises a polysaccharide, its makeup-removing power is markedly improved.

Compositions 1 to 7 are evaluated in terms of foam quality. The results obtained are as follows:

| | Positive area (g · sec) |
|---|---|
| Composition 7 (comparative) | 60.65 |
| Composition 6 (comparative) | 54.8 |
| Composition 1 (invention) | 99.55 |
| Composition 2 (invention) | 114.49 |
| Composition 3 (invention) | 89.01 |
| Composition 4 (invention) | 78.44 |
| Composition 5 (invention) | 72.53 |

These results show that the foam quality is markedly better when the composition comprises, in combination, spiculisporic acid, an alkyl polyglycoside and a polysaccharide.

The invention claimed is:

1. A foaming aqueous composition comprising from 0.1% to 15% by mass relative to the total mass of the composition of spiculisporic acid, at least one base, from 0.5% to 30% by mass relative to the total mass of the composition of at least one nonionic surfactant chosen from alkyl polyglycosides, which correspond to formula (II) below:

in which:
the radical R denotes a linear or branched alkyl radical including from 8 to 30 carbon atoms;
the group G is a saccharide residue; and
a is a number ranging from 1 to 10; and between 0.1% and 10% by weight relative to the total weight of the composition of at least one polysaccharide chosen from at least one pectin, alginate-based compounds, guar gums and nonionic derivatives thereof, pullulan and hyaluronic acid, in which the ratio R1 of the number of moles of total base(s) to the number of moles of spiculisporic acid is strictly greater than 1 and wherein the mass ratio R2 of the mass of surfactants chosen from the alkyl polyglycosides to the mass of spiculisporic acid is less than or equal to 12.5.

2. The composition according to claim 1, in which the at least one base is chosen from arginine, triethanolamine, potassium hydroxide and sodium hydroxide, and mixtures thereof.

3. The composition according to claim 1, in which the content of spiculisporic acid ranges from 0.5% to 10% by mass relative to the total mass of the composition.

4. The composition according to claim 1, in which the ratio $R_1$ is strictly greater than 1 and less than or equal to 2.5.

5. The composition according to claim 1, wherein the saccharide residue is from glucose.

6. The composition according to claim 1, in which the saccharide residue is chosen from glucose, dextrose, saccharose, fructose, galactose, maltose, maltotriose, lactose, cellobiose, mannose, ribose, dextran, talose, allose, xylose, levoglucan, cellulose and starch.

7. The composition according to claim 1, in which the alkyl polyglycoside(s) are chosen from caprylyl/capryl glucoside, decyl glucoside, lauryl glucoside and cocoyl glucoside.

8. The composition according to claim 1, in which the alkyl polyglycoside(s) are present in a content ranging from 1% to 25% by weight relative to the total weight of the composition.

9. The composition according to claim 1, in which the mass ratio R2 of the mass of surfactants chosen from alkyl polyglycosides to the mass of spiculisporic acid is 0.1 to 12.5.

10. The composition according to claim 1, in which the polysaccharide(s) are chosen from pectin and alginate-based compounds.

11. The composition according to claim 1, in which the polysaccharide(s) are present in an amount of between 0.1% and 5% by weight relative to the total weight of the composition.

12. A cosmetic device for treating keratin materials comprising an aqueous composition comprising from 0.1% to 15% by mass relative to the total mass of the composition of spiculisporic acid, at least one base, from 0.5% to 30% by mass relative to the total mass of the composition of at least one nonionic surfactant chosen from alkyl polyglycosides, which correspond to formula (II) below:

in which:
the radical R denotes a linear or branched alkyl radical including from 8 to 30 carbon atoms;
the group G is a saccharide residue; and
a is a number ranging from 1 to 10; and at least one polysaccharide, in which the ratio R1 of the number of total base(s) to the number of moles of spiculisporic acid is strictly greater than 1; and wherein the mass ratio $R_2$ of the mass of surfactants chosen from the alkyl polyglycosides to the mass of spiculisporic acid is less than or equal to 12.5; and a foam dispenser for dispensing said composition in the form of a foam.

13. The composition according to claim 1, in which the content of spiculisporic acid ranges from 0.5% to 10% by mass relative to the total mass of the composition.

14. The composition according to claim 1, in which the content of spiculisporic acid ranges from 0.8% to 5% by mass relative to the total mass of the composition.

15. The composition according to claim 2, in which the content of spiculisporic acid ranges from 0.8% to 5% by mass relative to the total mass of the composition.

16. The composition according to claim 2, in which the ratio $R_1$ is strictly greater than 1 and less than or equal to 2.5.

17. The composition according to claim 3, in which the ratio $R_1$ is strictly greater than 1 and less than or equal to 2.5.

18. The composition according to claim 1, in which the at least one base is chosen from arginine, triethanolamine, potassium hydroxide and sodium hydroxide, and mixtures thereof and the alkyl polyglycoside(s) are chosen from caprylyl/capryl glucoside, decyl glucoside, lauryl glucoside and cocoyl glucoside.

19. The cosmetic device according to claim 12, wherein the at least one polysaccharide is chosen from at least one pectin, alginate-based compounds, guar gums and nonionic derivatives thereof, pullulan and hyaluronic acid.

20. A cosmetic process for cleansing and/or removing makeup from a keratin material in which a composition as defined in claim 1 is applied to said keratin material.

21. The process according to claim 20, in which the composition is applied in foam form.

22. A cosmetic process for cleansing and/or removing makeup from skin which comprises applying the composition as defined in claim 1 to said skin.

* * * * *